United States Patent [19]
Hung

[11] Patent Number: 5,938,159
[45] Date of Patent: Aug. 17, 1999

[54] COMPUTER MONITOR SUPPORTING BRACKET

[76] Inventor: Teng-Shun Hung, No. 231, Jeu-Ren St., Pai-Ho Town, Tai-Nan Hsien, Taiwan

[21] Appl. No.: 08/891,076

[22] Filed: Jul. 10, 1997

[51] Int. Cl.$^6$ ........................................................ A47F 7/00
[52] U.S. Cl. .................. 248/278.1; 249/921; 249/231.71
[58] Field of Search .................................... 248/917, 918, 248/919, 920, 921, 922, 923, 371, 278.1, 289.11, 231.71, 281.11, 186.2, 284.1

[56] References Cited

U.S. PATENT DOCUMENTS

| | | | |
|---|---|---|---|
| D. 325,868 | 5/1992 | Bartok | D8/380 |
| 4,562,987 | 1/1986 | Leeds et al. | 248/920 X |
| 4,619,427 | 10/1986 | Leymann | 248/919 X |
| 4,844,387 | 7/1989 | Sorgi et al. | 248/281.11 X |
| 5,123,621 | 6/1992 | Gates | 248/920 X |
| 5,277,392 | 1/1994 | Rossmann et al. | 248/919 X |
| 5,553,820 | 9/1996 | Karten et al. | 248/921 X |

*Primary Examiner*—Ramon O. Ramirez
*Assistant Examiner*—Stephen S. Wentsler
*Attorney, Agent, or Firm*—A & J

[57] ABSTRACT

A computer monitor supporting bracket has a main body, a locating seat, a supporting block, a clamping device, and a framework. The main body is provided with a flat top and a receiving groove at the bottom for the locating seat to be pivotally mounted thereon via a pin and an adjusting bolt. The adjusting bolt can be rotated to regulate the position of the engaged locating seat and the main body either upwards or downwards into a desirable angle. In addition, the supporting block is mounted to the locating seat via screws being secured to the bottom end of a stepped shaft. The stepped shaft pivotally joined to the locating seat and a washer permits the supporting block and the locating seat to be switched left and right correspondingly. A fending plate disposed at the one top side of the supporting block is abutted against the underside of the locating seat to provide the supporting force for bearing heavy load. Finally, a pivoting axle disposed at the bottom of the supporting block is pivotally joined to a threaded bolt of the clamping device and the framework pivotally to the main body via mounting members. The threaded bolt received within a housing and capped with a disk cover at the bottom works with a clipping arm to generate clamping force for securing purpose. The mounting members stopped by the protruding dots after being led through the extending feet of the framework and then turned over for 180° have slanting slopes at one side so that the framework can be turned by a certain angle when sustaining a keyboard or data sheets thereon.

1 Claim, 5 Drawing Sheets

COMPUTER MONITOR SUPPORTING BRACKET

BACKGROUND OF THE INVENTION

The present invention is related to a computer monitor supporting bracket, especially to a supporting bracket for use of computer monitor, comprising a main body, a locating seat, a supporting block, a clamping device, and a framework, wherein the main body is pivotally mounted to the supporting block and the clamping device via the locating seat so as to easily regulate the direction of the supporting bracket, either up-and-down or left-and-right. The main body is pivotally joined to the locating seat by a pin at one side and an adjusting bolt at the other side. The adjusting bolt can be rotated to adjust the angle of the main body with the locating seat either upwards or downwards into a desirable position. In addition, by means of mounting members, the framework can be pivotally engaged with the main body to make the framework alternatively drawn for use or retrieved for storing.

Nowadays, computers have become a very important equipment no matter in the business world or in the daily household. Besides the computer, the accessories of computer have also come out numerously in the market. Yet, when it comes to the display of the computer and the accessories concerned, it causes several troubles as below:

1. A conventional computer desk is often used, wherein the desk is specifically designed for the display of the computer. Yet, due to the design, the computer desk is quite limited in use. Apart from the specified space for the computer, the computer monitor, and the keyboard respectively, there is rarely other space left at the table face for other uses. When other accessories are augmented, it is necessary to use other table to receive them. It is thus quite a waste of space.
2. When a conventional computer desk is employed, one must sit right in front of the computer desk so as to use the computer properly. It is quite a limit in the mobility of computer-using and can cause great inconvenience to a user.
3. It is also possible to use an ordinary office table to locate all those articles related to the computer. However, without an appropriate support for those articles such as the computer monitor and the keyboard, it is very troublesome to use a computer, much less the tiresome to use a computer on an improper surface.

SUMMARY OF THE PRESENT INVENTION

It is, therefore, the primary object of the present invention to provide a supporting bracket for the computer monitor, comprising a main body, a locating seat, a supporting block, a clamping device, and a framework wherein the main body having a flat top plane to support a computer monitor is pivotally mounted to the supporting block and the clamping device via the locating seat. The locating seat has an adjusting bolt which can be rotated to regulate the position of the main body and the locating seat either upwards or downwards into a desirable angle. Via the clamping device, the computer monitor supporting bracket can be flexibly fixed securely onto the edge of any table. The supporting block pivotally joined to the clamping device permits said supporting bracket to be suspended at the top of any office table without taking much space. In addition, the framework disposed at the bottom of the main body can be drawn out to provide space for the receiving of a keyboard. Due to the pivoting connection, the supporting bracket can be easily and conveniently rotated and adjusted in all directions, either up-and-down or left-and-right.

DETAILED DESCRIPTION OF THE PREFERRED EMBODIMENTS

Figure 1:
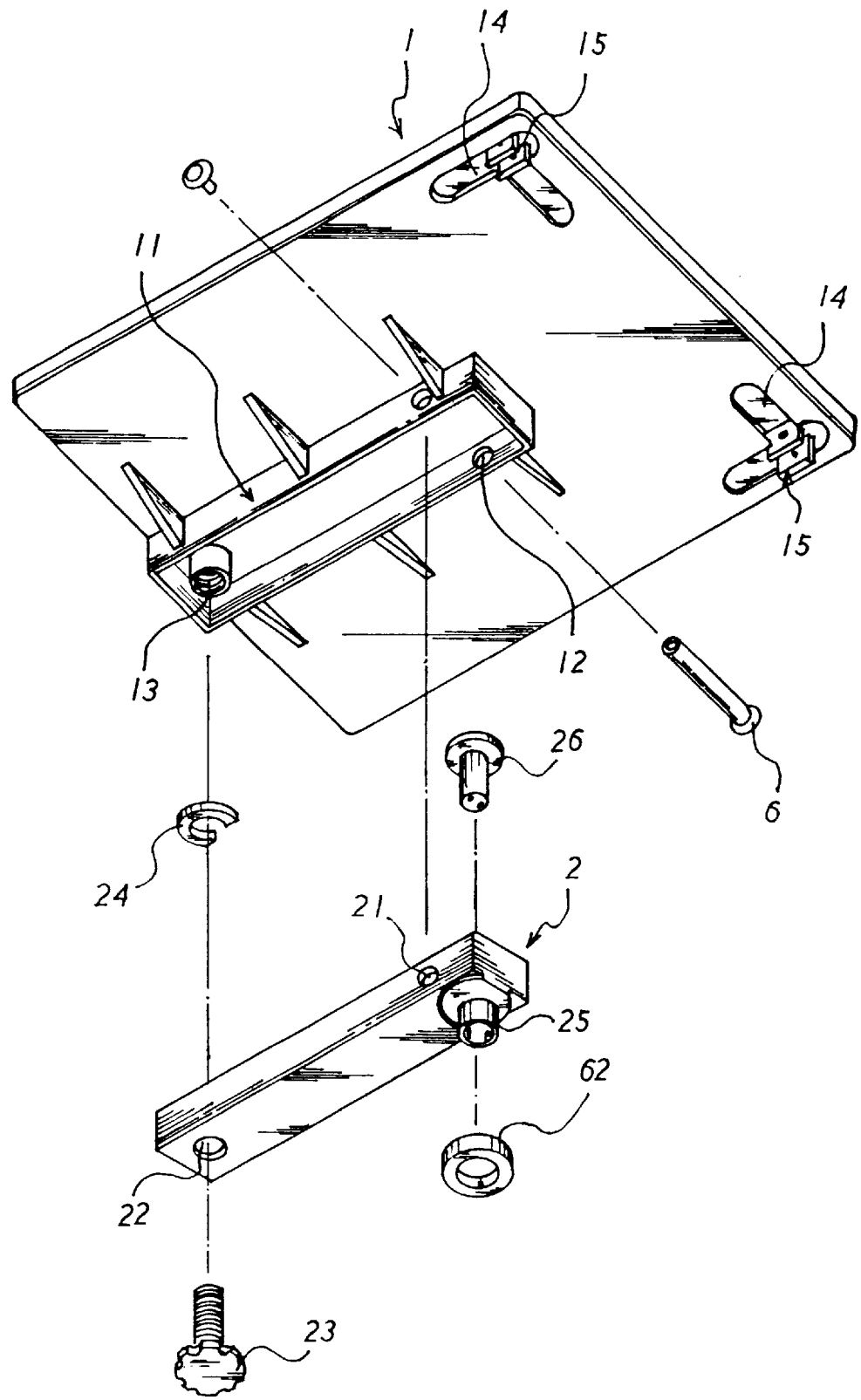
FIG. 1 is a diagram showing the components of the main body and the locating seat of the present invention.

The present invention is related to a computer monitor supporting bracket, especially to a supporting bracket for use of computer monitor, comprising a main body 1, a locating seat 2, a supporting block 3, a clamping device 4, and a framework 5.

Please refer to FIG. 1. The main body 1 has a flat top plane for a computer monitor to be displayed thereon and a receiving groove 11 at the bottom side for the locating seat 2 to be mounted thereon. Two opposite pivot holes 12 are disposed at one end of both lateral flanges of the receiving groove 11 and a screw mount 13 is located therewithin at the other end of the receiving groove 11 thereof. In addition, two opposite L-shaped slots 14 define both front lateral corners of the main body 1 wherein each L-shaped slot 14 is provided with a pair of pivoting plates 15 therewith. The locating seat 2, a means corresponding to the receiving groove 11 of the main body 1, is provided with a protruding flange hole 25 extending downwardly at one end. A stepped shaft 26 is pivotally led through the protruding flange hole 25 and further passed through a washer 62 at the bottom end. A bolt hole 22 is disposed at the other end of the locating seat 2. An adjusting bolt 23 is adapted to be passed through the the bolt hole 22 thereof wherein via a C-shaped ring 24 the adjusting bolt 23 is further secured to the screw mount 13 of the receiving groove 11 thereof. In addition, two opposite through holes 21 are defined at both lateral flanges of the locating seat 2 matching to the pivot holes 12 of the receiving groove 11 thereof.

Figure 2:
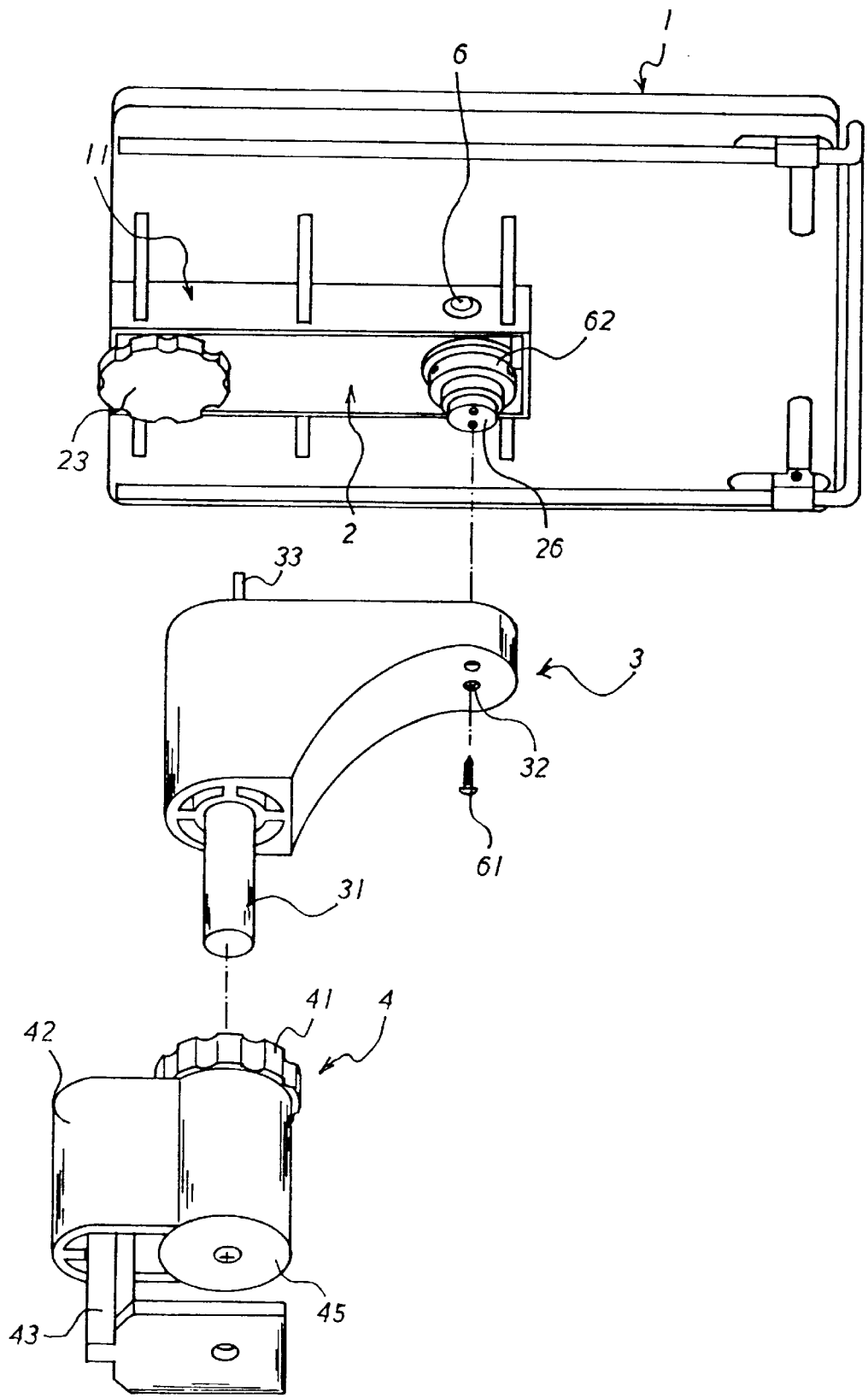
FIG. 2 is a diagram showing the components of the supporting block and the clamping device of the present invention.
Figures 3, 3A:
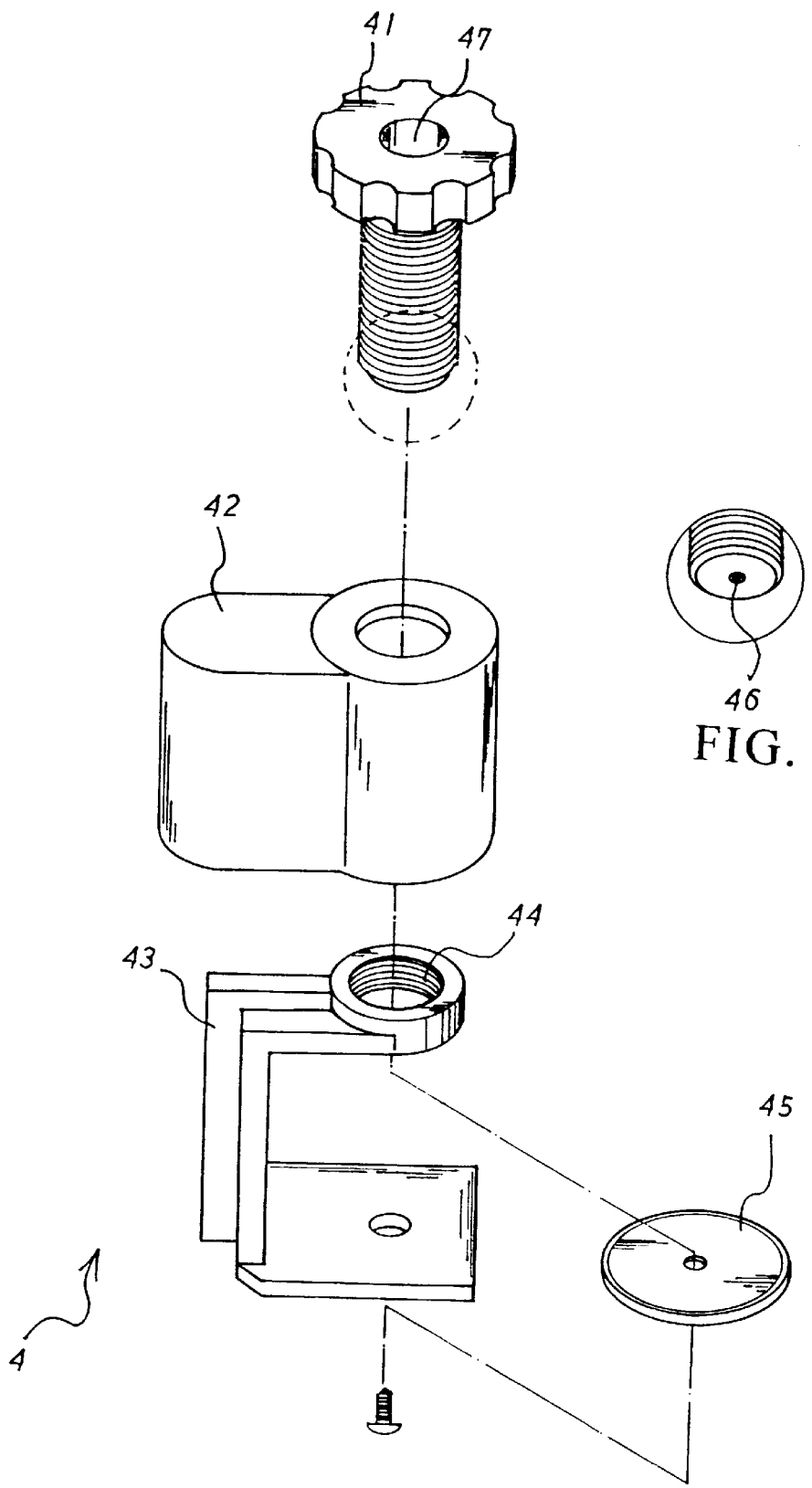
FIG. 3 is a diagram showing the components of the clamping device of the present invention.
FIG. 3A is a partially enlarged view of the bottom plane of the threaded bolt of the clamping device.

Please refer to FIGS. 2, 3. The supporting block 3 is an inverted L-shaped structure having a pivoting axle 31 disposed at the bottom end and screw holes 32 disposed at the plane face of one end. Screws 61 are adapted to be passed through the screw holes 32 so as to secure the supporting block 3 onto the bottom end of the stepped shaft 26. A fending plate 33 is disposed at the top plane at one end of the supporting block 3. The clamping device 4 is comprised of a threaded bolt 41 which first led through a housing 42 is screwed up to a clipping arm 43 via a threaded hole 44 disposed at the top end of the clipping arm 43. A disk-like cover 45 is further adapted to cap the bottom plane of threaded bolt 41 via a screw hole 46 as shown in FIG. 3A and to abut tightly against the housing 42 joined to the clipping arm 43. Consequently, the threaded bolt 41 is rotatedly adjusted to regulate the corresponding distance between the housing 42 and the bottom plane of the clipping arm 43 so as to generate clamping force for securing purpose. In addition, the top plane of the threaded bolt 41 is provided with an axle hole 47 for the engagement of the pivoting axle 31 of the supporting block 3.

Figure 4:
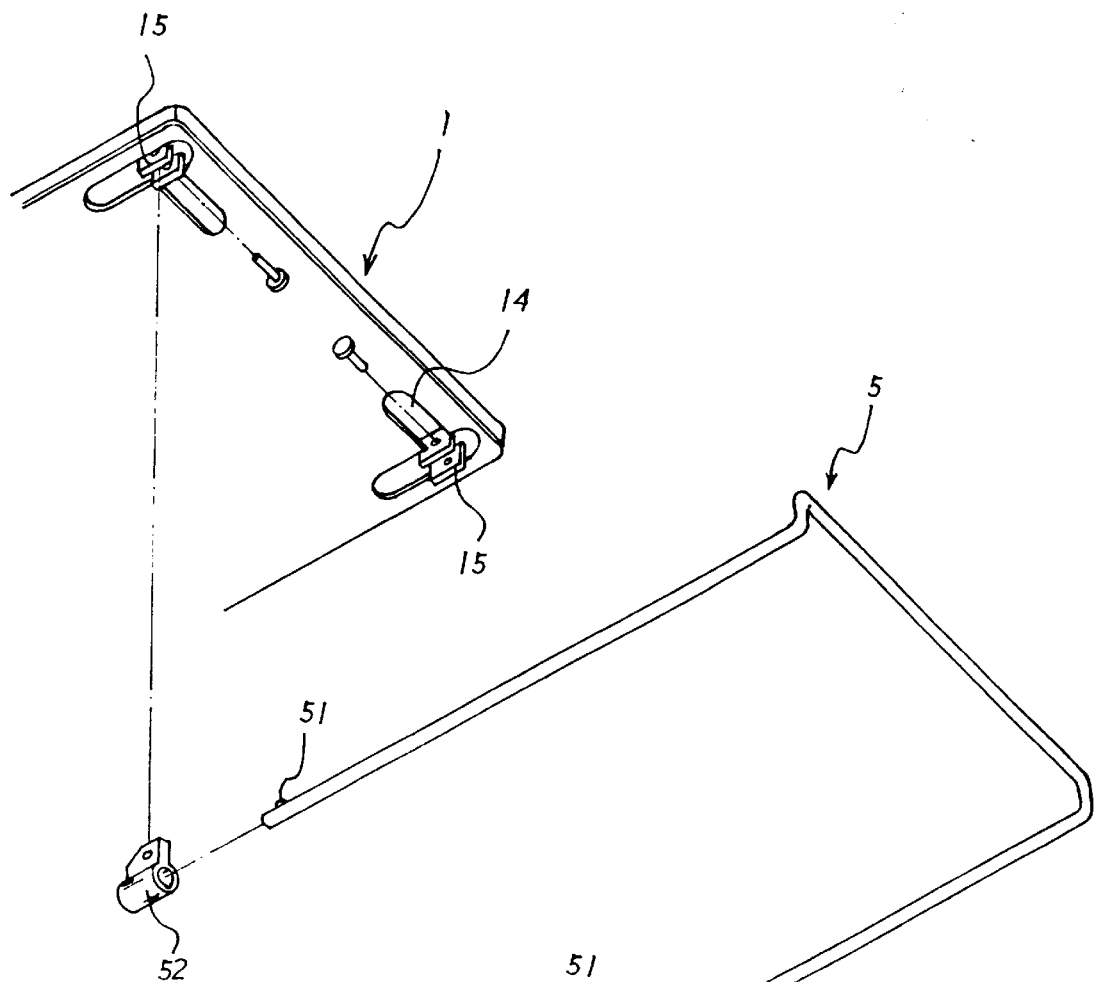
FIG. 4 is a diagram showing the components of the framework of the present invention.
Figure 4A:
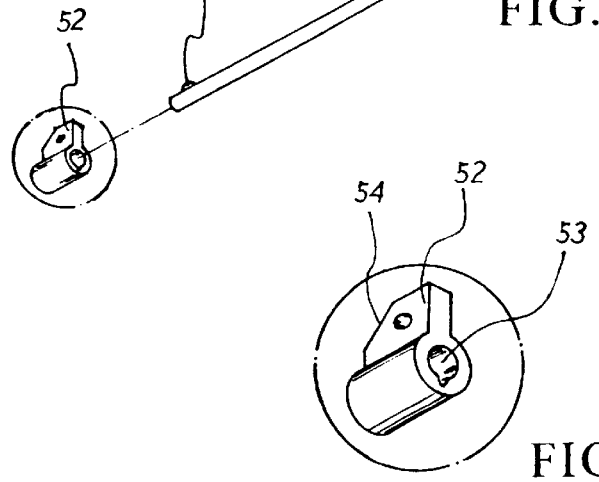
FIG. 4A is a partially enlarged view of the mounting members of the framework.

Please refer to FIG. 4. The framework 5 is a U-shaped rod bent upwardly at the front end, having protruding dots 51 disposed at the extending feet of the U-shaped rod thereof. Mounting members 52 having indented grooves 53 corresponding to the protruding dots 51 of the framework 5 as shown in FIG. 4A are adapted to be led through both feet of the framework 5. The mounting members 52 are first led through the protruding dots 51 thereof and then turned around for 180° so as to be retained by the protruding dots 51 at both feet of the U-shaped rod thereof. In addition, each of the mounting members 52 is provided with a slanting slope 54 at one lateral side.

Figure 5:
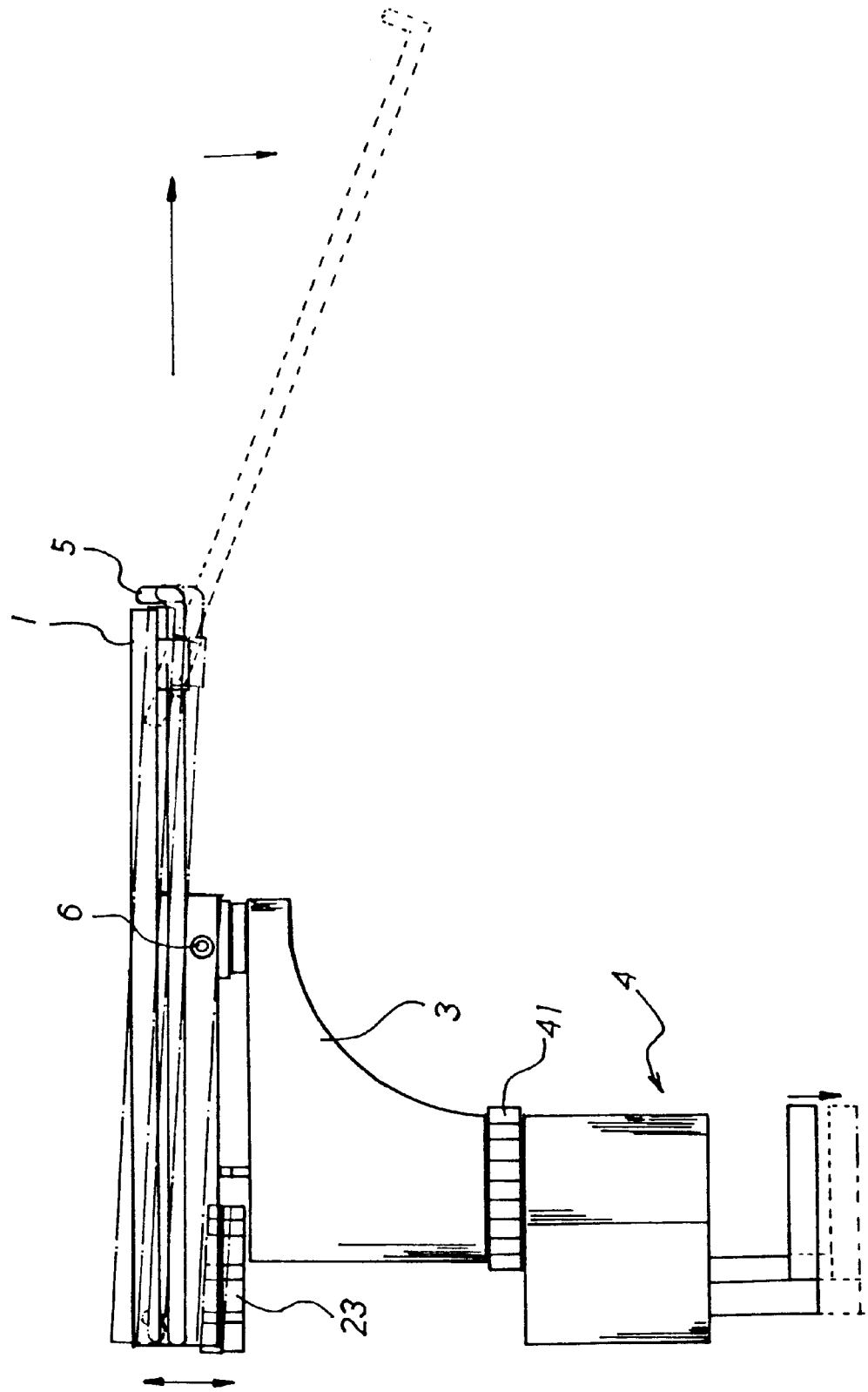
FIG. 5 is an embodiment showing the present invention in operation.

Please refer to FIG. 5. By the above arrangement, the locating seat 2 is capable of being engaged with the receiving groove 11 of the main body 1 via a pin 6 at one end and the adjusting bolt 23 at the other end. The pin 6 pivotally joins the pivoting holes 12 of the receiving groove 11 thereof and the through holes 21 of the locating seat 2; while the adjusting bolt 23 passing through the bolt hole 22 of the locating seat 2 and the C-shaped ring 24 is screwed up to the screw mount 13 of the locating seat 11. Via the adjusting bolt 23 which can be adjusted either upwardly or downwardly, the main body 1 and the locating seat 2 can be regulated into a desirable angle for use. In addition, the supporting block 3 is further secured to the bottom end of the stepped shaft 26 of the locating seat 2 via screws 61 at one end and abutted against the underside of the locating seat 2 via the fending plate 33 at the other end of the top thereof. The stepped shaft 26 pivotally engaged with the locating seat 2 and the washer 62 permits the engaged locating seat 2 and the supporting block 3 to be rotated correspondingly; while the fending plate 33 abutted beneath the locating seat 2 provides the necessary supporting force to bear the load. Finally, the pivoting axle 31 of the supporting block 3 is pivotally joined to the axle hole 47 of the clamping device 4 and the mounting members 52 of the framework 5 pivotally engaged with the pivoting plates 15 disposed at the L-shaped slots 14 of the main body 1. The slanting slopes 54 of the mounting members 52 permit the framework 5 to be turned into a certain angle, and the L-shaped slots 14 of the main body 1 provide the space to receive the upturned ends of the framework 5 as shown in FIG. 5.

In practical use, the computer monitor supporting bracket of the present invention is fixedly secured to the edge of any table via the clamping device 4. Computer monitor is put on the flat top of the main body 1 and the framework 5 is drawn and displayed to receive the keyboard. Via the adjusting bolt 23, the angle of the computer monitor can be adjusted either up or down, and via the mechanism of the stepped shaft 26 and the pivoting axle 31, said monitor can be rotated into a desirable position according to the need of different people. In addition, the framework 5 can also be used to sustain data sheets when the keyboard is put on the table face so as to achieve the multifunctional uses of the present invention.

What is claimed is:

1. A computer monitor supporting bracket comprising a main body, a locating seat, a supporting block, a clamping device, and a framework, wherein said main body is provided with a flat surface at a top thereof and a receiving groove at a bottom side thereof, said receiving groove having pivot holes at one end of two lateral flanges thereof and a screw mount disposed therein at another end thereof, two opposite L-shaped slots being disposed at two front corners of said main body wherein each of said slots being provided with a pair of pivoting plates thereon;

said locating seat corresponding to said receiving groove has a protruding flange hole extending downwardly at one end through which a stepped shaft is led and joined to a washer, a bolt hole disposed at another end through which an adjusing bolt is passed and engaged with said screw mount of said receiving groove by a C-shaped ring, and two opposite through holes disposed at two lateral sides corresponding to said pivoting holes of said receiving groove;

said supporting block is an inverted L-shaped unit, having a pivoting axle disposed at a bottom end thereof, screw holes at one lateral plane, and a fending plate at one side of a top plane thereof;

said clamping device is comprised of a threaded bolt, a housing, and a clipping arm, said threaded bolt being led through said housing and engaged with said clipping arm via a threaded hole disposed at a top end of said clipping arm, a disk cover being further adapted and screwed up to a bottom end of said threaded bolt to be abutted against a bottom side of said housing; thus, via said threaded bolt being rotatedly adjustable to regulate a corresponding distance between said housing and a bottom plane of said clipping arm, clamping force is generated for securing purpose; in addition, an axle hole being provided at a top side of said threaded bolt;

said framework is a U-shaped rod bent upwardly at a front end, having protruding dots disposed at two extending feet of said U-shaped rod through which mounting members each defining an indented groove therewithin for matching to said protruding dot being first led and then turned over for 180 degrees for stopping said mounting members at the extending feet of said U-shaped rod; in addition, a slanting slope being disposed at one side of each said mounting member;

whereby, said locating seat is mounted to said receiving groove of said main body via a pin at said one end and said adjusting bolt at another end, said pin pivotally joining said through holes of said locating seat and said pivot holes of said receiving groove, and said adjusting bolt passing through said bolt hole of said locating seat and said C-shaped ring to be engaged with said screw mount of said receiving groove, said adjusting bolt permitting pivoting adjustment of said main body relative to said locating seat into a desirable angle therebetween said supporting block is engaged with said locating seat with screws being passed through said screw holes of said supporting block to secure one side of said supporting block to a bottom end of said stepped shaft; said stepped shaft pivotally joined to said protruding flange hole of the locating seat and said washer permits the engaged locating seat to be rotated relative to said supporting block, said fending plate disposed at one top side of the supporting block and being abutted against an underside of said locating seat to provide necessary supporting for bearing a heavy load said supporting block is pivotally mounted to the clamping device and the framework is pivotally mounted to the main body; said pivoting axle of said supporting block capable of being pivotally engaged with the axle hole disposed at the top side of the threaded bolt of the clamping device, and said mounting members stopped at the extending feet of the framework of being joined to the pivoting plates of the L-shaped slots thereof; the slanting slopes of said mounting members permitting the framework to be turned to a certain angle relative to the main body for use.

* * * * *